May 31, 1960
J. R. RENNELS
2,939,138
BEARING CORRECTION MEANS FOR A DIRECTION FINDING ANTENNA
Filed Nov. 6, 1956
2 Sheets-Sheet 1
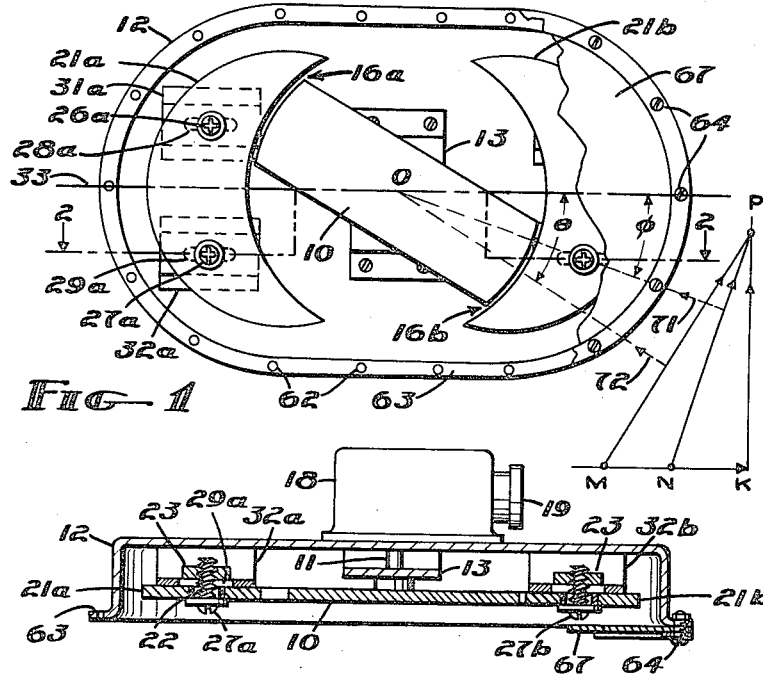
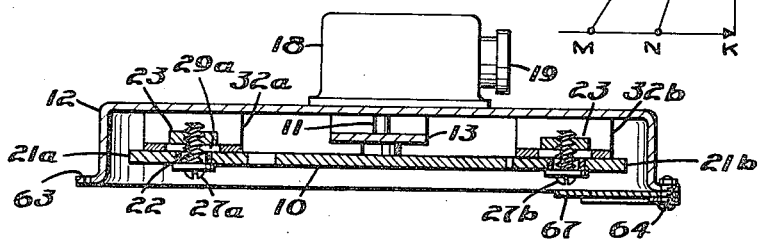
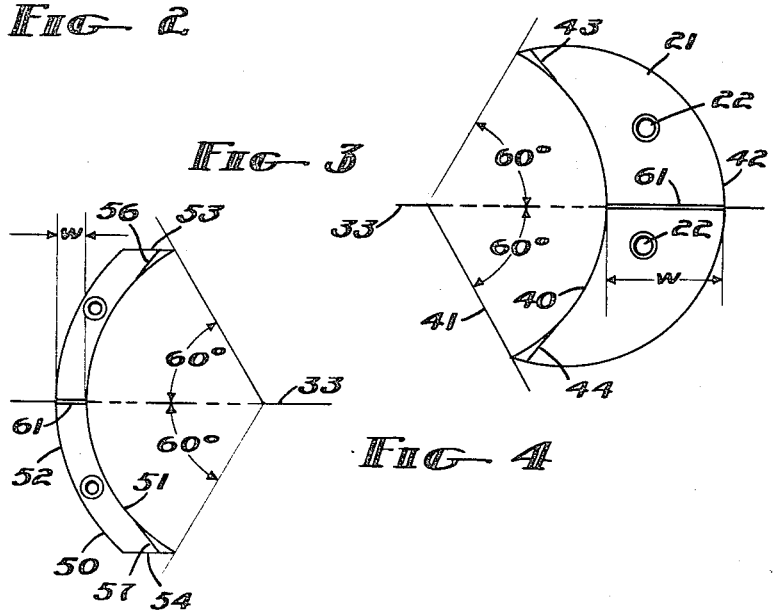
INVENTOR
JOHN R. RENNELS
BY Moody and Goldman
ATTORNEYS May 31, 1960 J. R. RENNELS 2,939,138
BEARING CORRECTION MEANS FOR A DIRECTION FINDING ANTENNA
Filed Nov. 6, 1956 2 Sheets-Sheet 2

INVENTOR
JOHN R. RENNELS
BY
Moody and Goldman
ATTORNEYS

United States Patent Office 2,939,138
Patented May 31, 1960

2,939,138

BEARING CORRECTION MEANS FOR A DIRECTION FINDING ANTENNA

John R. Rennels, Marion, Iowa, assignor to Collins Radio Company, Cedar Rapids, Iowa, a corporation of Iowa Filed Nov. 6, 1956, Ser. No. 620,645

3 Claims. (Cl. 343—114)

This invention relates to bearing-correction means for a direction finding antenna, which is particularly useful on aircraft.

The direction of an electromagnetic wave front is deflected about the surfaces of an aircraft because of the physical configuration of the conducting surfaces of the aircraft. The amount of deflection of the wavefront varies with the angle that the wave approaches the aircraft. The centerline of the aircraft along the top or bottom of its fuselage presents the special condition where the aircraft is bisymmetrical, and provides a special condition for the deflection of a wavefront. At such axial positions, there are only four directions where no deflection occurs, and they occur when the wavefront is propagated either parallel to the axis of the aircraft or transverse to the axis. However, the wave is attenuated more in the transverse direction than in the axial direction.

Maximum azimuth deflection (maximum error) occurs in each of the four azimuth quadrants of the aircraft when the wave approaches at an angle that is generally between 30 and 50 degrees from the axis of the aircraft. The angle causing maximum bearing error varies from aircraft to aircraft because it is dependent upon the particular physical configuration of an aircraft. Hence, if it is assumed that the true bearing of a radio transmitter is 45 degrees from the axis of an aircraft, a short-thick fuselaged aircraft will deviate the wavefront direction by not more than five or six degrees; while, on the other hand, a long-thin fuselaged aircraft can deviate the wavefront direction by more than 25 degrees.

Furthermore, the bearing error varies to some degree along the aircraft centerline due primarily to effects of the wing.

Conventional loop A.D.F. (Automatic Direction Finding) antennas, which sense direction by a null, orient in the direction of the wavefront that it receives. Accordingly, the angular position of such A.D.F. antenna is in error by the amount that the direction of the received wavefront is deviated by the particular aircraft structure. The observed bearing obtained from an A.D.F. receiver in the aircraft includes the same error, unless some means of correction is provided.

It is, therefore, an object of this invention to provide means for correcting the deviation of a wavefront at an A.D.F. antenna in all azimuth directions from an aircraft.

It is another object of this invention to provide a bearing-compensated A.D.F. antenna assembly which is small in size and can be mounted flush with the surface of an aircraft to cause almost no wind resistance.

It is a further object of this invention to provide a novel bearing corrector for a rotating antenna having a permeable core.

It is another object of this invention to provide an A.D.F. antenna assembly which is capable of providing substantially complete bearing compensation for almost any type of aircraft structure.

It is a further object of this invention to provide an A.D.F. antenna assembly wherein a final adjustment for precise bearing compensation for a particular aircraft is easily done, It is another object of this invention to provide bearing correction means for an A.D.F. antenna which can obtain more bearing correction than any bearing correction means heretofore known.

It is a still further object of this invention to provide a bearing connector which effectively boosts the signal in the directions where it is most attenuated by an aircraft structure.

The invention provides at least one crescent-shaped compensating member of permeable material which is fixed symmetrical with the axis of an aircraft. It is positioned adjacent to and cooperates with an antenna rotor having an permeable core. Means are provided for adjusting the amount of bearing correction required by a particular aircraft by adjusting the position of the compensating member with respect to the rotor member. The antenna assembly can be flush mounted on an aircraft in an oblong metal container that provides an additional amount of bearing compensation.

Further objects, features and advantages of this invention will become apparent to a person skilled in the art upon further study of the invention, in which:

Figure 1 is an elevational view of an illustrative form of the invention;

Figure 2 is a section taken through line 2—2 of Figure 1;

Figure 5:
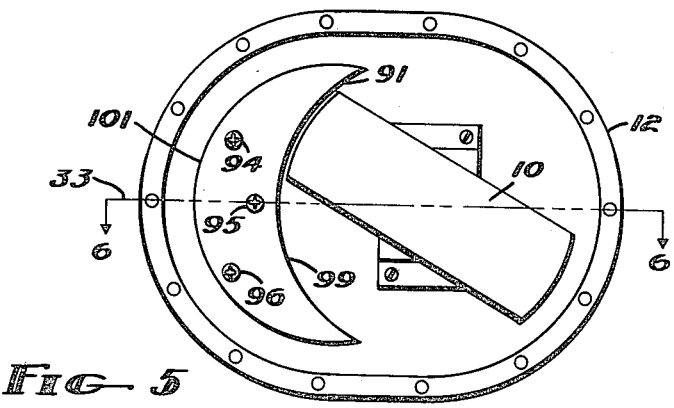
Figure 6:
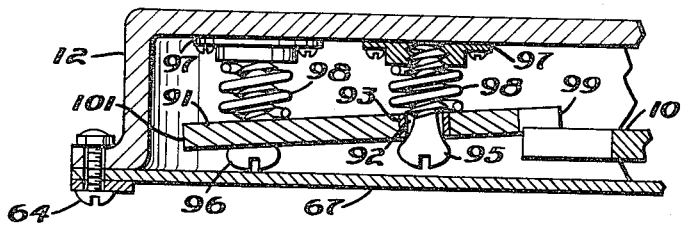
Figure 7:
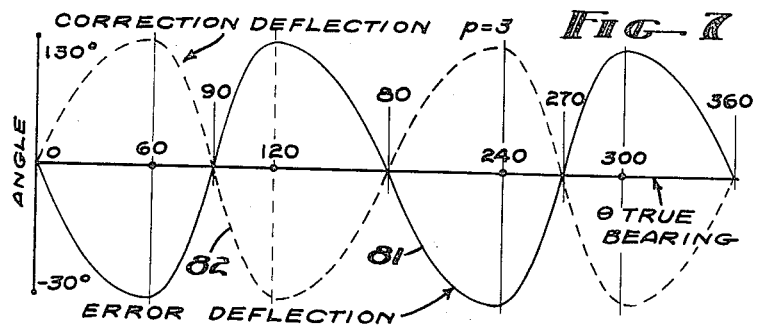
Figure 8:
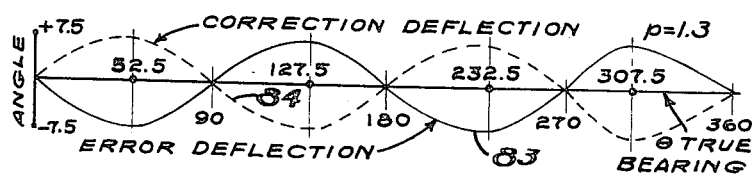

Figure 3 illuustrates one form of corrector provided by the invention;

Figure 4 illustrates another type of corrector provided by the invention;

Figure 5 shows another form of the invention;

Figure 6 is a sectional view taken across line 6—6 in Figure 5; and,

Figures 7 and 8 illustrate error and correction curves used in explaining the invention.

Now referring to the invention in more detail, Figures 1 and 2 illustrate a form of the invention which has a rotating antenna member 10 which is fixed to a shaft 11 that is supported rotatably by a metallic cover member 12 and a supporting plate 13 fixed to member 12.

Rotor antenna 10 is a conventional ferrite-stick type of antenna and is comprised of a flat bar of ferrite material with conventional windings (not shown) wound about it and weather proofed by a applied conventional dielectric compound. The sensitivity of antenna 10 is primarily a function of its length and is only secondarily a function of its width and thickness. The windings (not shown) of antenna 10 have leads (not shown) which pass through shaft 11 into a housing 18 which includes a connector 19 that enables a transmission line (not shown) to receive the energy of rotating antenna 10. Conventional means such as slip rings are provided to remove energy from the rotatable leads. Housing 18 also includes a servo motor (not shown) which positions antenna 10 to a null in the well-known manner, to align the axis of rotor 10 in the direction of a sensed wavefront.

A pair of similar permeable correctors 21a and 21b are mounted in opposite ends of container 12. Correctors 21 have crescent shapes and are formed of ferrite material with holes that contain metal bushings 22 which receive screws 26 and 27. A pair of plates 31 and 32 are fixed to container 12 underneath each corrector and each captures a nut 23 that threadedly receives a respective screw 26 or 27 in respective slots 28 and 29. Each corrector is positioned bisymmetrically with respect to the axis 33 of container 12, and is adjustable along axis 33 to any position along the length of slots 28 and 29. For example, the slots may be one inch in length to permit an axial adjustment of one inch for each corrector.

The maximum amount of bearing correction is provided when the correctors are positioned with a minimum gap 16 to rotor 10 that is only sufficient to prevent mechanical contact. A minimum amount of bearing correction is provided when the correctors are moved farthest away from antenna 10 to obtain maximum gaps 16 in Figure 1.

Each antenna compensator 21 is constructed as shown in Figure 3 and has an inner arc 40 with a radius 41 that is only slightly larger than the radius of antenna rotor 10 to permit mechanical clearance between them at the minimum gap position. Arc 40 is symmetrical about center line 33 and preferably has an angle of about 120 degrees, which has been experimentally found to be optimum.

The outer arc 42 of compensator 21 is limited by the ends of inner arc 40. The width W between arcs 40 and 42 at the center of corrector 21 and the permeability of its material determine the maximum amount of bearing correction it can provide.

Outer arc 42 need not be precise since it is the permeability and dimension W that are primarily controlling. For example, arc 42 could instead be a part of a circle having a center that is the same center of arc 40, with its ends limited by lines that are parallel to axis 33 and that pass through the defined ends of inner arc 40.

The highest amount of correction is obtained with two correctors 21 having maximum dimensions W and using highest permeability ferrite. In such case, compensation can be obtained on an aircraft having a maximum bearing error of twenty-eight degrees, for example. In many cases, the necessary amount of correction is much less, such as fifteen degrees, for example. Thus, in some cases, only one corrector 21 need be used (see Figure 5), since the amount of correction with only one corrector 21 is one-half the amount of correction obtainable with two correctors. Thus, where the corrector material has a permeability of approximately 500, dimension W is approximately 2¾ inches, and an 8-inch long rotor bar is used, one corrector provides a range of 11 to 17 degrees of maximum correction, while two correctors provide a range of 18 to 28 degrees of maximum correction.

Because ferrite materials are brittle and fragile, it has been found experimentally that the sharp ends of corrector 21 may be trimmed slightly without causing any significant error in bearing correction. Lines 43 and 44 illustrate how the sharp corners may be removed.

Figure 4 shows another type of corrector which may be substituted for the correctors 21 in Figure 1 to provide still smaller amounts of bearing correction. Corrector 50 in Figure 4 is also bisymmetrical about center line 33 and is formed with an inner arc 51 that, like inner arc 40 in Figure 3, has a radius only slightly larger than the radius of its rotor 10 and extends for approximately 120 degrees. Outer arc 52 of corrector 50 is concentric with inner arc 51 and they are spaced by dimension W along center line 33. The remaining boundaries of corrector 50 are provided by straight lines 53 and 54 which pass through opposite ends of inner arc 51 parallel to center line 33. It has been found that the sharp corners of corrector 50 also can be reduced because of the fragileness of its ferrite material without substantially affecting its bearing correction properties. Thus, corrector 50 may be bounded by lines 56 and 57, which are tangential to inner arc 51.

A pair of correctors 51 used with an 8-inch long rotor bar and having a dimension W of ¾ of an inch with a permeability of 40 provide 7.5 to 10.5 degrees of bearing correction. When only a single corrector is used, a range of 5 to 7.5 degrees of correction is provided. Therefore, with the two given examples of correctors 21 and 50, any bearing correction between 5 and 28 degrees may be obtained, which will compensate almost any type of aircraft for bearing error over 360 degrees of azimuth.

It has further been found that a slight degree of signal-amplitude correction is provided by having a small axial gap 61 in the correctors. Such a gap may be provided conveniently by making each corrector into two symmetrical parts and cementing them together at the center.

The antenna assembly of Figure 1 is generally located in an opening at the bottom of the fuselage of an aircraft. Holes 62 are formed along the flange 63 of container 12 to permit bolts 64 to fasten the antenna assembly to an aircraft. A dielectric cover member and a precipitation-static cover 67 are fastened over the assembly flush with the skin of the aircraft so that there is substantially no air resistance caused by the antenna assembly.

Where an aircraft is at a substantial distance from a transmitting station providing vertically-polarized radiation, the radiated wavefront of magnetic lines travels in substantially horizontal planes. The conducting surface material of the aircraft has eddy currents induced by the received radiation. These eddy currents set up a small counter-radiation which vectorially adds with the received radiation to provide a resultant radiation pattern about the aircraft that is distorted in many different ways. The distortion varies from point to point about the aircraft and also varies at each point with variation of the angle that the radiation is received, with respect to the axis of the aircraft. Both the intensity and wavefront direction are distorted. The distorted radiation pattren is generally bisymmetrical about a center line drawn along the top or bottom of an aircraft. This is why center line 33 of the antenna assembly preferably coincides with one of such aircraft center lines, since the antenna assembly in Figure 1 compensates distortion bisymmetrically.

The distortion in the direction of the wavefront is responsible for bearing error. Line NP in Figure 1 vectorially represents a distorted wavefront at the fuselage of an aircraft. The true direction of the wavefront, which is provided in free space distant from the aircraft, is given vectorially by line MP.

Thus, distorted wavefront NP is travelling in the direction given by arrow 71; while the true wavefront, distant from the aircraft, is represented by arrow 72, which also is the true direction of the transmitting station from the aircraft.

Distorted wavefront NP can be resolved with respect to aircraft axis 33 into component vectors NK and KP, which are respectively parallel and perpendicular to center line 33 of the aircraft in the azimuth plane. Vector component KP is not greatly affected by compensators 21 since when it passes through the antenna windings of rotor 10, it does not then substantially pass through correctors 21.

However, axial vector component NK passes through both correctors 21a and 21b and is substantially strengthened by their permeability. Accordingly, vector NK is lengthened into a component vector MK, which resolves at the rotor windings into wavefront MP that simulates the true wavefront.

As a result, the windings on rotor 10 sense a null in the true direction of the wavefront in free space which is given by arrow 72. It is, therefore, essential that the correctors provide the proper lengthening of vector NK which can be adjusted by varying the coupling between them and the rotor.

When container 12 is made of conducting material, as in Figure 1, it provides a small additional amount of bearing correction due ot its oblong shape. Thus, if only a very small amount of bearing correction is required for a particular aircraft, the permeable correctors can be removed, leaving only rotor 10 in oblong metal container 12. Bearing correction is provided by the container because its oblong shape offers more difficulty to transverse magnetic lines than to axial magnetic lines in coupling rotor 10. The transverse lines must bend more sharply into the container than the axial lines to provide the same degree of coupling to rotor 10.

Referring again to the vectors shown in Figure 1, it will be noted that transverse component vector KP passes across the short dimension of the container, while axial component vector NP passes over the long dimension of container 12. Accordingly, transverse component vector KP cannot couple rotor 10 as well as axial component vector NK because of the sharper bending required for the magnetic lines representing vector KP. The resultant vector is deviated in the direction of the true bearing vector MP. Thus, the oblong shape of container 12 provides a further degree of bearing correction. This secondary correction is added to the primary correction obtained by the permeable correctors.

Without the invention, the amount of angular deflection of a wavefront at the center of an aircraft fuselage in free space is given by the following expression:

$$\tan \theta = p \tan \phi \quad (1)$$

where $\theta$ is the true bearing between the aircraft axis and the transmitting station, $\phi$ is the observed bearing of the deflected wave at the bottom of the aircraft fuselage, and $p$ is a constant which depends upon the physical structure of the aircraft. The value of $p$ will vary from about 4 for an aircraft having a long-narrow fuselage to nearly 1 for an aircraft having a short-thick fuselage.

The bearing error is the difference between the true bearing and the bearing of the deflected wave. It is defined as follows:

$$\text{Bearing error} = \theta - \phi = \theta - \tan^{-1}(1/p \tan \theta) \quad (2)$$

By differential calculus technique, the true bearing at which maximum bearing error ($\theta_{max}$) occurs is as follows:

Maximum bearing error $$= \tan^{-1}\left[p \tan\left(\sin^{-1}\frac{1}{\pm\sqrt{1+p}}\right)\right] - \sin^{-1}\left(\frac{1}{\pm\sqrt{1+p}}\right) \quad (3)$$

Figures 7 and 8 illustrate the variations of bearing error of the deflected wave at an aircraft with variation in the true bearing of an aircraft from a transmitting station as the axis of the aircraft is rotated through 360 degrees in the azimuth plane. Deflection error curve 81 in Figure 7 shows how the bearing varies for an aircraft having a long narrow fuselage providing a constant $p$ equal to 3. The counter-deflection of the wavefront by the invention is illustrated by corrector deflection curve 82 in Figure 7. This curve is substantially the same as curve 81 but is reversed. Thus, the counter-deflection provided by the invention at any angle is the amount necessary to cancel the deflection error and restore the wavefront to its true bearing at the A.D.F. antenna used by the invention.

Note in Figure 7 that the maximum error positions are nonsymmetrical with respect to each other. In Figure 7, maximum bearing error occurs when the wavefront approaches at the angles: 60 degrees, 150 degrees, 240 degrees and 300 degrees.

As the gap between correctors 21 and rotor 10 is varied in Figure 1, the corrector deflection curve varies in its maximum amplitude and in the angular positions where maximum deflection occurs. As the gap is increased the amount of maximum bearing correction for curve 82 decreases and the angles where it occurs approach closer to the symmetrical positions: 45 degrees, 135 degrees, 225 degrees, and 315 degrees.

The deflection error varies from aircraft to aircraft, and the correctors must be selected and adjusted to match the aircraft's particular error curve. As the aircraft fuselage becomes larger in cross section in proportion to its length, its factor $p$ approaches one and its bearing error approaches zero.

Curve 83 in Figure 8 shows the deflection error for an aircraft that has a short fuselage with a large cross section that provides constant $p$ with the value 1.3. The maximum error caused to the wavefront at the center of the aircraft fuselage is then plus-or-minus 7.5 degrees at true bearing angles of 52.5 degrees, 127.5 degrees, 232.5 degrees and 307.5 degrees. Matching curve 84 illustrates the correction required from the invention in this case. It may be provided by using a single compensator of the type illustrated in Figure 4 with a minimum gap between it and an end of the rotor bar.

Figures 5 and 6 illustrate a form of the invention utilizing only a single corrector 91 with a different type of adjustment than is used in Figure 1 which permits a saving in space for the antenna assembly. In Figures 5 and 6, the gap between the correctors and the rotor is not varied axially along the center line 33. Rather, corrector 91 is displaced transversely with respect to center line 33 and rotor 10.

Corrector 91 is formed with holes 92, which receive respective metal bushings 93. Three screws 94, 95 and 96 are respectively received through bushings 93, and their ends are threadedly received in members 97 fastened to container 12. Springs 98 are received about screws 94, 95 and 96 to bias corrector 91 against the expanded ends of the screws.

Corrector 91 is adjusted by turning the three screws so that corrector 91 is in the same plane or in a parallel plane with rotor bar 10. After the assembly is mounted in an aircraft, cover 67 is removed, and the single screw 95 is turned, which displaces the inner edge 99 of corrector 91 with respect to the rotor end. This adjustment varies the correction deflection curve as explained above until it equals the deflection error curve of the given aircraft. The amount of maximum correction decreases as edge 99 is moved upwardly in Figure 6.

If a further amount of decrease in maximum bearing correction is required, it can be obtained by turning screws 94 and 96 and moving the opposite end 101 of corrector 91 further into container 12. As it moves into the container, it receives greater shielding and its end coupling with the rotor is released. Accordingly, its correction ability is decreased.

Furthermore, the method of mounting shown in Figures 5 and 6 maintains the angle of arc for the inner edge of the compensator more nearly constant with respect to rotor 10, when the three screws are adjusted to maintain the corrector in a parallel plane to the rotor. It is noted in Figure 1 that as the correctors are moved away from the rotor, their inner arc 40 provides a smaller arc with respect to the rotation of the rotor. This limits the maximum gap allowable because the correction curve becomes distorted when the relative corrector arc becomes excessively large. Furthermore, in Figure 1, container 12 must be made longer by the amount of gap movement provided. This additional length is not necessary with the adjustment means shown in Figures 5 and 6.

A desired consequence of the permeable correctors is that they do not attenuate the signal in the correction process. Rather, they boost the signal when it is most attenuated by the aircraft structure. That is, they boost the magnetic wavefront component that is propagating in a direction transverse to the aircraft, which component is most attenuated by the aircraft structure.

Temperature variations of the invention have not had any substantial effect upon its compensating characteristics.

Although this invention has been described with respect to particular embodiments thereof, it is not to be so limited as changes and modifications may be made therein which are within the full intended scope of the invention as defined by the appended claims.

I claim:

1. Bearing-correction means for a direction-finding antenna comprising a supporting plate, a coil antenna, a rotor bar of permeable material being provided through said antenna and rotatably supported by said plate, at least one crescent-shaped member of permeable material adjustably supported by said plate, with the concave side of said member being adjacent to said rotor bar, and said concave side having an arc of approximately 120 degrees, said corrector being formed with at least one slot located parallel to the line of symmetry of said member, and fastening means being received through said slot to fasten said member to said supporting plate at an adjustable position with respect to said rotor, with said adjustable position being fixed for a given bearing-correction situation.

2. Bearing correction means for a direction-finding antenna located on the fuselage of an aircraft comprising a container member made of conducting material having an oblong shape and horizontally open on one side to radio waves, with the axis of said container member aligned with the longitudinal axis of said fuselage, a ferrite antenna rotatably mounted in said container, with its center of rotation being on said axis, a crescent-shaped compensator made of permeable material and supported by said container adjacent to one end of said antenna, with said compensator being bisected by said axis, said compensator being formed with a pair of slots parallel to said axis, a pair of screws received respectively through said slots and threadedly fastened to said container, whereby said compensator can be positioned along said axis with respect to said antenna to control quadrantal error compensation.

3. Bearing correction means for a direction-finding antenna located on the fuselage of an aircraft comprising a container member made of conducting material having an oblong shape and horizontally open on one side to radio waves, with the axis of said container member aligned with the longitudinal axis of said fuselage, a ferrite antenna rotatably mounted in said container, with its center of rotation being on said axis, a crescent-shaped compensator made of permeable material and supported by said container adjacent to one end of said antenna, with said compensator being bisected by said axis, said compensator being formed with a plurality of holes, a plurality of screws respectively passing through said holes and threadedly fastened to said container, each of said screws having an expanded head, and spring-biasing means positioned between said container member and said compensator to bias said compensator against the expanded heads of said screws, whereby said compensator can be displaced from the plane of said rotor by adjusting said screws, while maintaining a bisymmetric position with respect to said axis.

References Cited in the file of this patent

UNITED STATES PATENTS

| 2,394,787 | Kreager | Feb. 12, 1946 |
| 2,419,480 | Bryan et al. | Apr. 22, 1947 |
| 2,718,003 | Hemphill et al. | Sept. 13, 1955 |
| 2,804,617 | Polydoroff | Aug. 27, 1957 |

FOREIGN PATENTS

| 874,946 | France | June 1, 1942 |
| 51,631 | France | Dec. 10, 1942 |
| | (Addition to No. 869,869) | |
| 903,196 | France | Jan. 8, 1945 |
| 1,120,847 | France | Apr. 23, 1956 |